United States Patent [19]

Pike

[11] Patent Number: 5,728,759

[45] Date of Patent: Mar. 17, 1998

[54] WATERBASE PRESSURE SENSITIVE ADHESIVES AND METHODS OF PREPARATION

[76] Inventor: Charles O. Pike, 15 Hillview Rd., Asheville, N.C. 28805

[21] Appl. No.: 515,395

[22] Filed: Aug. 15, 1995

[51] Int. Cl.$^6$ ............... C08L 31/04; C08L 7/00; C08L 27/00; C09J 7/04; B32B 7/06; B32B 7/12; B32B 15/04

[52] U.S. Cl. ............ 524/270; 524/271; 524/273; 524/274; 524/297; 524/487; 524/501; 524/505; 524/523; 524/575; 524/522; 427/207.1; 427/208.4; 428/343; 428/355; 156/334; 525/89

[58] Field of Search ............... 524/270, 297, 524/487, 505, 523, 501, 575, 271, 273, 274; 428/343; 427/207.1, 208.4

[56] References Cited

U.S. PATENT DOCUMENTS

| | | | |
|---|---|---|---|
| 3,658,740 | 4/1972 | Marrs | 524/274 |
| 4,338,227 | 7/1982 | Ballard | 524/143 |
| 4,438,232 | 3/1984 | Lee | 524/272 |
| 4,540,739 | 9/1985 | Midgley | 524/764 |
| 4,644,032 | 2/1987 | Keskey et al. | 524/549 |
| 4,937,111 | 6/1990 | Fontanilla et al. | 428/354 |
| 5,116,676 | 5/1992 | Winslow | 428/343 |
| 5,286,781 | 2/1994 | Gotott et al. | 524/505 |
| 5,290,842 | 3/1994 | Sasaki et al. | 524/271 |
| 5,342,872 | 8/1994 | Huber | 428/294 |
| 5,385,783 | 1/1995 | Patel et al. | 428/343 |
| 5,407,993 | 4/1995 | Lyons et al. | 524/501 |
| 5,455,293 | 10/1995 | Wood et al. | 524/271 |
| 5,476,896 | 12/1995 | Pereira et al. | 524/501 |
| 5,502,089 | 3/1996 | Bricker et al. | 524/505 |
| 5,504,136 | 4/1996 | Davis et al. | 525/236 |

*Primary Examiner*—Andrew E. C. Merriam
*Attorney, Agent, or Firm*—Carroll F. Palmer

[57] ABSTRACT

New water base pressure sensitive adhesives with capability of use in production of high temperature quality masking tape are aqueous dispersions of the following mixture of components in the percentages by weight as specified:

| Component | Percentage |
|---|---|
| Adhesive entity | 45 to 65 |
| Tackifier resin | 20 to 40 |
| Plasticizer | 1 to 20 |
| Stabilizer | 0.1 to 10 |
| Curing entity | 0.1 to 10 |
| Optional additives | 0 to 20 |

The various components constitute the disperse phase of the aqueous dispersion and have a combined weight of between about 30 to 70% of the total weight, the curing entity is a combination of a plurality of curing agents that exhibit different curing speeds and the adhesive entity is a combination of a plurality of adhesive elastomers having different molecular weights.

High temperature quality masking tapes made from the new PS adhesives avoid "freeze down" and "ghosting".

15 Claims, No Drawings

WATERBASE PRESSURE SENSITIVE ADHESIVES AND METHODS OF PREPARATION

BACKGROUND OF THE INVENTION

1. Field of the Invention

This application relates to waterbase pressure sensitive adhesives and methods for their preparation. More particularly, it concerns pressure sensitive adhesive compositions in the form of aqueous dispersions that can be partially cured at relatively high temperatures without significantly altering their coating viscosity and methods for preparation of such dispersions and use thereof, e.g., in manufacture of high temperature masking tapes.

2. Description of the Prior Art

Pressure sensitive adhesives (PSAs) require rubber or equivalent adhesive elastomer as an essential component to provide the adhesive ability to bond one surface to another and this adhesive elastomer component is mixed with additional components, e.g., tackifiers, anti-oxidants, plasticizers, curing agents, etc., to create the final PSA.

Pressure sensitive adhesives are conventionally of two different types, i.e., (a) solvent base in which the solid components are solvated in an organic liquid and (b) water base in which the solid components exist as a solid phase dispersed in an aqueous phase. These two different types of PSAs are created by different methods of production.

With the solvent type PSAs, the elastomeric component typically exists as a two phase system consisting of high molecular weight phase of the elastomer and a low molecular weight phase thereof. Such two phase polymer systems are usually created by breaking down rubber or equivalent elastomer, e.g., by mechanical working on rollers. This two phase material is then mixed with other required components and the resulting mass is thinned with a liquid solvent to form a fluid adhesive that can be applied to substrate to form an adhesive layer by evaporation or other removal of the solvent.

With the water base type PSAs, one starts with at least one preformed latex consisting of a dispersion of unbroken elastomer component in an aqueous phase. This dispersion is then mixed with dispersions of other required components to produce the desired water base PSA that can be applied to a substrate to form an ahesive layer by evaporation or other removal of water.

A major use of PSAs is for the production of masking tape employed extensively in many types of coating operations, e.g., painting of automobile bodies wherein temperatures of 300° F. or higher may be used to dry the paint. One problem encountered with masking tapes in their use with high temperature painting methods is the tendency of the tape to freeze onto the surface to which it has been applied making it difficult or impossible to remove at the completion of paint job.

OBJECTS

A principal object of the invention is the provision of new forms of pressure sensitive adhesives and methods for their production.

Further objects include the provision of:

1. New PSAs from which high temperature masking tapes may be prepared that do not freeze to an automobile body or window on exposure of the tapes to relatively high temperatures while in contact with such surface.

2. New method for production of waterbase PSAs that are capable of being used to manufacture masking tapes that qualify for automotive paint baking use.

3. Water base pressure sensitive adhesive compositions that exhibit high resistance to unwanted breakdown when subjected to temperatures of 300° F. or above.

4. Water base pressure sensitive adhesive compositions that can be used as the adhesive layer of masking tapes that qualify for high temperature automotive finishing operations.

5. Improved masking tapes that do not "freese down" on extended exposure to the surface an automobile, boat or other structure to which the tape is attached when the structure is left outside after a painting job in which the masking tape has been used.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished, in part, in accordance with the invention by the provision of a fluid water base pressure sensitive adhesive with capability of use in production of high temperature quality masking tape comprising an aqueous dispersion of the following mixture of components in the percentages by weight as specified below based on the total combined weight of the components:

| Component | Broad Percentage | Preferred Percentage |
| --- | --- | --- |
| Adhesive entity | 45 to 65 | 50 to 60 |
| Tackifier resin | 20 to 40 | 25 to 35 |
| Plasticizer | 1 to 20 | 5 to 10 |
| Stabilizer | 0.1 to 10 | 1 to 5 |
| Curing entity | 0.1 to 10 | 1 to 5 |
| Optional additives | 0 to 20 | 0 to 10. |

In preferred embodiments of the new adhesives, the components constitute the disperse phase of the aqueous dispersion and have a combined weight of between about 30 to 70% of the total weight of the adhesive, the curing entity is a combination of a plurality of curing agents that exhibit different curing speeds for the mixture, the adhesive entity is a combination of a plurality of adhesive elastomers having different molecular weights and the adhesive entity is partially cured.

The objects are further accomplished, in part, in accordance with the invention by the provision of a pressure sensitive adhesive, high temperature quality masking tape comprising an adhesive layer consisting of the following mixture of components in the percentages by weight as specified based on the total combined weight of the components:

| Component | Percentage |
| --- | --- |
| Adhesive entity | 45 to 65 |
| Tackifier resin | 20 to 40 |
| Plasticizer | 1 to 20 |
| Stabilizer | 0.1 to 10 |

-continued

| Component | Percentage |
| --- | --- |
| Curing entity | 0.1 to 10 |
| Optional additives | 0 to 20 | wherein the curing entity is a combination of a plurality of curing agents that exhibit different curing speeds for the mixture, the adhesive entity is a combination of a plurality of adhesive elastomers having different molecular weights, and the adhesive entity is partially cured.

Additionally, the objects of the invention are accomplished by the provision of an improved process for the production of a fluid water base pressure sensitive adhesive with capability of use in production of high temperature quality masking tape from an aqueous dispersion of the components of the adhesive one component of which is an adhesive entity by inclusion of the step of heating the aqueous dispersion to a temperature above 150° F. for sufficient time to partially cure the adhesive entity. In such new process the aqueous dispersion comprises at least two adhesive entities of substantially different molecular weights and at least one fast acting curing agent and at least one slow acting curing agent.

In preferred embodiments, a process for production of a fluid water base pressure sensitive adhesive of the invention with capability of use in production of high temperature quality masking tape comprises in combination the steps:

a. providing a first aqueous dispersion of a first adhesive entity, b. providing at least one other aqueous dispersion of another adhesive entity having a molecular weight substantially lower than the first adhesive entity, c. providing at least one aqueous dispersion of tackifier resin, d. providing at least one plasticizer, charging the provided materials a–d streamwise in controlled amounts into a mixing vessel and subjecting them to intermixing, charging controlled amounts of stabilizer, curing entity and optional additives into the mixing vessel and intermixing them with the previously charged materials, heating the resulting adhesive mixture to a temperature above 150° F. for sufficient time to partially cure at least some of the adhesive entity therein, and discharging the resulting pressure senstive adhesive from the mixing vessel.

The adhesive entity which is the primary component of the new adhesives of the invention consists of a mixture of at least two polymeric materials, one of which has a substantially high molecular weight and the other a substantially lower molecular weight. In preferred embodiments, the adhesive entity comprise three or more polymeric materials of different molecular weights and chemical classification selected from the group consisting of natural rubber, elastomeric block copolymers, polychloroprene, acrylic polymer and copolymers.

The polymeric materials comprising the adhesive entity are provided in accordance with the invention as aqueous dispersions, i.e., typically referred to as emulsions or latexes, comprising between about 35–70%, especially 40–60%, by weight of the polymeric material as disperse phase with the remainder percentage being water containing emulsifying agents and like optional additives as the continuous phase.

Natural rubber latex, typically containing about 38%/wt. of water, is a preferred elastomeric dispersion for use as an adhesive entity component of the adhesives of the invention. A preferred rubber latex for such use is "GNL-150" commerically available from Goodyear Tire & Rubber Co.

Elastomeric block copolymers usable in the adhesives of the invention are examplified by A-B and A-B-A block copolymers wherein the A blocks consist of polyvinylarene blocks and the B block consists of polybutadiene or polyisoprene, partially or completely hydrogenated. Typically, the A blocks constitute at least 25% by weight of the total block copolymer, preferably 25% to 50%, and the molecular weight of the copolymer is between about 100,000 and 200,000 and preferably between about 120,000 and 160,000. The A blocks are preferably polystryene, but may be substituted styrene polymer, e.g., o, p, or m methyl styrene, dimethyl styrene, o, p, or m ethyl styrene, etc. Examples of such class of block copolymers commercially available in latex form are AB copolymers, e.g., Butafan-144 (58% water latex) from BASF-Chattanooga and ABA copolymers from the Shell Chemical Company with current designation numbers of "WRC-105-89", "WRC-287-89", "WRC-288-89", "WRC-471-89" and "WRC-395-89". Also, "Europrene SolT193" from Enichem AMERICAS. Such block copolymers are capable of producing adhesive formulations having high strength as measured by peels, tensile modulus and creep resistance combined with low viscosity.

Examples of polychloroprene latexes useful in the invention include "Neoprene 115" (60% water latex) supplied by E. I. duPont deNemours Co.

Examples of acrylic polymer latexes useful in the invention include "N-619" (50% water latex) supplied by Rohn & Hass Co. and "XPD 1811" (50% water latex) supplied by B. F. Goodrich Co. Acrylics offer the advantage of their own resistance to oxidative break down while acting as a phase mode modifier.

Tackifier resins for pressure sensitive adhesives are a known class of materials as disclosed in U.S. Pat. Nos. 4,526,577, 4,460,728 and 4,411,954, which disclosures are incorporated herein by reference. Particularly useful tackifier resins include (1) hydrocarbon resins, e.g., alicyclic petroleum hydrocarbon resins, so-called C5 resins, hydrogenated derivatives of the foregoing and styrene modified cycloaliphatic resins, (2) natural and synthetic terpene resins, e.g., styrene modified natural terpene resins, and (3) rosin esters, e.g., pentaerythritol esters of hydrogenated rosins and phenolic-modified pentaerythritol esters of rosin. Advantageously, the tackifier resins have a ring and ball softening point of between about 15° and 25° C.

A preferred hydrocarbon resin useful as a tackifier in the invention is "108E", a C5 resin emulsion containing 50% water supplied by Exxon Chemical Co. Examples of other commercially available hydrocarbon resins useful as tackifier resins include "Wingtack 10 or 86 or 95" (Goodyear), "Eastotac H100" and "Eastman H-100L" (Eastman Kodak Chemicals), "Escorez 5320 or 5300 or 5380 or 1310" (Exxon Chemical Co.), "Res D2039", "Regalite R100" and "Regalrez 1018" (Hercules Chemical Co.), "Arkon P125 or P100 or P90" (Arakawa Chemical Co.).

Preferred rosin ester tackifiers for use in the invention are "Aquatac 6085", a rosin ester emulsion containing 33% water supplied by Arizona Chemical Co. and "Pentalyn H", a hydrogenated rosin ester emulsion containing 50% water, supplied by Hercules Chemical Co. Examples of other commercially available rosin esters useful as tackifier resins include "Zonester 85 or 100" and "Sylvatac 1100 or 1105" (Arizona Chemical Co.); "Pentalyn H" and "Foral 85 or 105" (Hercules Chemical Co.); "Novatac 100 or 101" (Gerogia Pacific Corp.) and "Unitac UR-100" (Union Camp Corp.).

Examples of commercially available terpene resins useful as tackifier resins include "Zonarez 7100 or 7115" (Arizona Chemical Co.), "Piccolyte A-115, A-125 or C-115" (Hercules Chemical Co.) and "Nirez 1100, 1115 or 1125" (Reichhold Chemical Co.).

Plasticizers for PS adhesives are a known class of materials, sometimes called elastomer plasticizing oils. They include paraffinic and aromatic hydrocarbons, mixtures thereof and esters of aliphatic and aromatic acids (see U.S. Pat. No. 2,551,600 incorporated herein by reference).

A preferred plasticizer for use in forming the new adhesives is "Santicizer 278", a complex octyl phthalate commercially available from Monsanto Chemical Co. Other examples of commercially available adhesive plasticizers include "Hercolyn D" (Hercules Chemical Co.), "Neville NP10" (Neville Chemical Co.), "Shellflex 371" (Shell Chemical Co.); "Tufflo 6056" (ARCO Chemical Co.) and "Jayflex DINA" (Exxon Chemical Co.).

Curing agents, sometimes called cross-linking agents, for PS adhesives are a known class of materials that can be divided into three classes, i.e., fast cure, medium cure and slow cure. The present invention uses a combination of two or more curing agents from these classes, e.g., a slow cure agent and a fast cure agent, as the curing entity component.

A preferred slow cure curing agent for use in forming the new adhesives is "Special 96", a blend of hydrobrominated phenol resin available from Schenecady Chemical Co. and blocked isocyanates available form RFE-Bayer A.G. At temperatures between 250° F. and 310° F., as the PS adhesive is dried, the isocyanate block is broken to release the fast acting isocyanate and the phenol resin is available for providing longer period of temperature curing.

Preferred fast cure curing agents for use in forming the new adhesives are butyl zimate, "Zirex" and zinc resinate supplied by Arizona Chemical Co.

Examples of medium cure curing agents for use in forming the new adhesives include sulfads (hexamethylene polysulfides), "Ethyl Selenac", Selenium diethyl dithiocarbama & "Amax", N-oxydtethylene benzothiazole 2-sulfenamide, available from R. T. Vanderbilt Co.

The curing components of the invention are active over the range in which the polymers under high heat curing undergo degradation and over the period of total cure time this is kept in physical balance by a series of cures that offset the loss of strength that would be obtained using only a single class of curing agent. All of the curing systems of the invention are catalyzed by the use of ZN++, either as an oxide, zinc resinate, zinc duodeconoate or butyl Zimate.

The curing arrangements for the new PS adhesives permit required curing to be accomplished without seriously effecting viscosity or coatability. Further, cures are accomplished easier in the new mobile water base compositions, as contrasted to solvent base compositions, because molecules are freer to move about then in the solvent systems, i.e., cures ongoing in solvent systems have drastic effects upon viscosity that seriously limit coating at relatively high solids content.

Stabilizers for PS adhesives are a known class of materials, sometimes called antioxidants, include hindered phenols, high aromatic secondary amines and phosphites. Mixtures of two or more such materials may be used in the new adhesives of the invention.

Preferred stabilizers for use in the new adhesives are "Wingstay L", a disperson of a hindered phenol in 50% water supplied by Goodyear and "BNX-1000" available from Mayzo Inc. which is a mixture of hindered amines, hindered phenols and phosphites dispersed in a fatty acid epoxy resin. Examples of other commercially available materials of this class include "Irganox 565 or 1010 or 1330" (Ciba-Geigy Corp.), "Ethanox 330" (Ethyl Corp.), "Ionol" (Shell Chemical), "Polygard HR" & "Naugard 445" (Uniroyal Co.) and "Borg-Warner 626" or trinonyl pyrophosphate [TNPP] (Chemical Additive Div., GE Co.). A particularly useful stabilizer, designated CACS, consists of a mixture of the following ingredients in the stated percentages by weight, namely, hindered phenol 20%, epoxy fatty acid 50%, trinonyl phenyl phosphite 25% and hindered amine 5%.

Optional additives that may be incorporated in the new pressure sensitive adhesives of the invention in the amounts indicated include wetting agents, e.g., "Silwet 77" supplied by Monsanto Chemical Co. and "Aerosol OT" supplied by Amercian Cyanamid Corp., pH adjustors, dyes, fillers and pigments.

The new adhesives are prepared by blending the components in suitable mixing equipment until a homogeneous blend is obtained, typically blending for 1–2 hours. When blending has been completed, the resulting fluid adhesive mixture is heated to a temperature above 150° F., particularly 180° F., for about 1 hour to partially cure its adhesive entity components.

The new PS adhesives have broad utility and are capable of application to substrates by a variety of different methods, but they are particularly useful for the production of masking tapes that qualify for high temperature automotive finishing operations.

The process for manufacture of a high temperature quality pressure sensitive masking tape in accordance with the invention comprises the steps of:

A. providing an aqueous dispersion of the following mixture of components in the percentages by weight as specified based on the total combined weight of said components:

| Component | Percentage |
| --- | --- |
| Adhesive entity | 45 to 65 |
| Tackifier resin | 20 to 40 |
| Plasticizer | 1 to 20 |
| Stabilizer | 0.1 to 10 |
| Curing entity | 0.1 to 10 |
| Optional additives | 0 to 20 | wherein:
  a. said components constitute the disperse phase of said aqueous dispersion and have a combined weight of between about 30 to 70% of the total weight of said adhesive,
  b. said curing entity is a combination of a plurality of curing agents that exhibit different curing speeds for said mixture,
  c. said adhesive entity is a combination of a plurality of adhesive elastomers having different molecular weights, B. heating the said mixture of components to a temperature above 150° F. for sufficient time to partially cure at least some of said adhesive entity therein to create a fluid water base pressure sensitive adhesive, C. providing a continuous sheet of unified paper of paper weight between about 25 to 30 lbs./ream, D. applying a uniform coating of said fluid water base pressure sensitive adhesive to said unified paper in an amount between about 1 to 2.0 ounce per square yard, E. removing water from the resulting coated paper to form a masking tape having a thickness between about 5 to 8 mils.

Steps A & B may, depending upon commercial circumstances, be conducted at a physical location separate and apart from steps C–D, e.g., the water base adhesive composition may be made at one plant or location and then used at another plant or location for application to the unified paper base.

Unified papers useable in the masking tape production methods of the invention are commercially available. They are typically made by saturation of crepe paper with a water base polymer latex squeezed through rollers to obtain a pickup of between 25–100% of the latex and then dried. The saturation polymers typically consist of rubber latex, carboxylated styrene/butadiene latex, butadiene latex, chloropreno latex, acrylic polymer latex, nitrile latex or blends of these. It is currently conventional practice in most saturation lines employed to make unified papers for adhesive tape production to put release coatings on in tandem. Such release coatings widely vary and are resistant to the PS adhesive and permit ease of unwind from the roll, but must also be receptive to paint used in a automobile painting operation in which the tape is used so as to avoid "flaking" of the paint upon completion of paint refinishing. A saturated and release coated crepe backing paper designed for use in preparation of PSA tape for automotive use is supplied by the Endura Corp. of Quakertown, Pa.

In forming masking tapes according to the invention, one advantageously selects a unified paper saturated with a polymer compatible with the polymer components of the water base adhesive composition of the invention used to form the desired masking tape to assure good bonding of the PS adhesive to the saturated paper substrate. Also, the choice of saturants for the paper backing provides as much resistance as possible to the heating cycle required in the painting operations in which the new masking tape is used.

High temperature quality pressure sensitive masking tape prepared in accordance with the invention are characterized by a thickness between about 5 to 8 mils, a strength of 15 to 20 lb./inch of width, an elongation of about 5 to 8% and a adhesion value range from 25 to 45 oz/inch. These new masking tapes do not "freeze down" to metal or glass parts of automobiles that are subjected to extended outdoor exposure following a conventional high temperature refinishing paint job. Also, such masking tapes are free of "ghosting", i.e., the presence of a cloud on a painted surface following the removal of masking tape.

DESCRIPTION OF THE PREFERRED EMBODIMENTS

This invention is further illustrated by the following examples of production of adhesives and masking tapes in accordance with the invention. Such examples are for the purpose of illustration and are not intended to limit the scope of the invention unless otherwise specifically indicated. In these examples and throughout the remainder of this specification and the appended claims, all parts are by weight and all percentages are by weight of the total weight of all combined components.

EXAMPLE 1

A quantity of a water base, pressure sensitive adhesive in accordance with the invention is prepared from the following materials in the quantities as indicated:

| Component | Typ | TP/W | AAmt. | % | Description |
|---|---|---|---|---|---|
| 1 "GNL-150" | AE | 54 | 32.4 | 18.8 | natural rubber latex - 38% water |
| 2 "Butafan-144" | AE | 54 | 22.7 | 13.2 | SB copolymer latex - 58% water |
| 3 "Neoprene 115" | AE | 12 | 4.8 | 2.8 | polychloroprene latex 60% water |
| 4 "N-619" | AE | 60 | 30.0 | 17.4 | acrylic latex - 50% water |
| 5 "XPD 1811" | AE | 12 | 6.0 | 3.5 | acrylic latex - 50% water |
| 6 ammonia water | OA | 10 | 2.8 | 1.6 | $NH_4OH$ + 72% water (pH adjustor) |
| 7 "108E" | TR | 51 | 25.5 | 14.8 | C5 resin emulsion - 50% water |
| 8 "Aquatac 6085" | TR | 27 | 18.1 | 10.5 | diprop. rosin ester emulsion - 33% water |
| 9 "Pentalyn H" | TR | 15 | 7.5 | 4.4 | hydrogenated rosin ester emulsion - 50% water |
| 10 "Wingstay L" | ST | 12 | 6.0 | 3.5 | hindered phenol emulsion - 50% water |
| 11 "Zirex" | CE | 3.0 | 1.5 | 0.9 | zinc resinate solution in 50% toluene |
| 12 "BNX-1000B" | CE | 6.0 | 3.0 | 1.7 | a blocked isocyanate and antioxidant solution in 50% xylene |
| 13 "Santicizer 278" | PL | 6.0 | 6.0 | 3.5 | complex octyl phthalate plasticizer |
| 14 "Special 96" | CE | 10 | 5.0 | 2.9 | curing agent solution in 50% xylene |
| 15 sulfads | CE | 0.90 | 0.45 | 0.3 | curing agent dispersion in 50% water |
| 16 "Silwet 77" | OA | 0.35 | 0.35 | 0.2 | wetting agent |

Typ = Component Type
AAmt. = Active amount of component in added material
AE = Adhesive entity
OA = Optional Additive
ST = Stabilizer
% = Percent by wt. of AAmt. component in total wt. all AAmt. of components
TP/W = Total parts by weight of added material
CE = Curing entity
PL = Plasticizer
TR = Tackifier resin The components are added streamwise in the order as listed above to a paddle stirrer by mixing vessel over a period of about one hour and then further mixed for another hour to form a viscous fluid uniform aqueous dispersion of the listed components 1–5 & 7–15 as the disperse phase in water as a continuous phase. The adhesive dispersion is then heated to a temperature of 180° F. for one hour to cause to curing entity to effect partial curing of the adhesive entity and thereafter the dispersion is discharged from the mixing vessel into storage containers.

EXAMPLE 2

A portion of the water base, pressure sensitive adhesive made by the process of Example 1 is used to produce high temperature quality masking tape by applying it to a unified paper having a weight of 28 lbs./ream using conventional blade coating 10 mil draw down bay to form a uniform coating at the rate of 1.25 oz/sq.yard of paper base. The water component of the resulting coated paper is then dried by passage through conventional adhesive tape drying equipment for 5 minutes at 1 70° F. and for 2 minutes at 300° F.

The resulting masking tape is determined to have an average thickness (caliper) of 7 mils [PSTC-33], a tensile strength of 18 lbs./inch of width [PSTC-31], an elongation of 7% [PSTC-31] and a peel adhesion value of 40 oz/inch [PSTC-1]. When used in standard high temperature automobile paint spray refinishing, the tape is found not to exhibit any appreciable "freeze down" or "ghosting".

The embodiments of the invention in which an exclusive property or privilege is claimed are defined as follows:

1. A fluid water base pressure sensitive adhesive with capability of use in production of high temperature quality masking tape comprising an aqueous dispersion of the following mixture of components in the percentages by weight as specified based on the total combined weight of said components:

| Component | Percentage |
| --- | --- |
| Adhesive component | 45 to 65 |
| Tackifier resin component | 20 to 40 |
| Plasticizer component | 1 to 20 |
| Stabilizer component | 0.1 to 10 |
| Curing component | 0.1 to 10 |
| Optional additives component | 0 to 20 | wherein:
a. said components constitute the disperse phase of said aqueous dispersion and have a combined weight of between about 30 to 70% of the total weight of said adhesive,
b. said curing component comprises three curing agents that exhibit different curing speeds for said mixture,
c. said adhesive component comprises a plurality of adhesive elastomers having different molecular weights selected from the group consisting of natural rubber latex, elastomeric block copolymers, polychloroprene, acrylic polymers and acrylic copolymers, and
d. said adhesive component is partially cured by said aqueous dispersion having been heated to a temperature above 150° F. for sufficient time to produce said partial cure.

2. The process for manufacture of a high temperature quality pressure sensitive masking tape which comprises in combination the steps:
A. providing an aqueous dispersion of the following mixture of components in the percentages by weight as specified based on the total combined weight of said components:

| Component | Percentage |
| --- | --- |
| Adhesive component | 45 to 65 |
| Tackifier resin component | 20 to 40 |
| Plasticizer component | 1 to 20 |
| Stabilizer component | 0.1 to 10 |
| Curing component | 0.1 to 10 |
| Optional additives component | 0 to 20 | wherein:
a. said components constitute the disperse phase of said aqueous dispersion and have a combined weight of between about 30 to 70% of the total weight of said adhesive,
b. said curing component comprises a plurality of curing agents that exhibit different curing speeds for said mixture,
c. said adhesive component comprises a plurality of adhesive elastomers having different molecular weights,
B. heating the said mixture of components to a temperature above 150° F. for sufficient time to partially cure at least some of said adhesive component therein to create a fluid water base pressure sensitive adhesive,
C. providing a continuous sheet of unified paper of paper weight between about 25 to 30 lbs./ream,
D. applying a uniform coating of said fluid water base pressure sensitive adhesive to said unified paper in an amount between about 1 to 1.5 ounce per square yard,
E. removing water from the resulting coated paper to form a masking tape having a thickness between about 5 to 8 mils.

3. A process for production of a fluid water base pressure sensitive adhesive with capability of use in production of high temperature quality masking tape comprising pressure sensitive adhesive consisting of the following mixture of components in the percentages by weight as specified based on the total combined weight of said components:

| Component | Percentage |
| --- | --- |
| Adhesive entity | 45 to 65 |
| Tackifier resin | 20 to 40 |
| Plasticizer | 1 to 20 |
| Stabilizer | 0.1 to 10 |
| Curing entity | 1 to 10 |
| Optional additives | 0 to 20 | which comprises in combination the steps:
a. providing a first aqueous dispersion of a first adhesive entity selected from the group consisting of natural rubber latex, elastomeric block copolymer latex, polychloroprene latex, and acrylic polymer latex,
b. providing at least one other aqueous dispersion of another adhesive entity having a molecular weight substantially lower than said first adhesive entity selected from the group consisting of natural rubber latex, elastomeric block copolymer latex, polychloroprene latex, and acrylic polymer latex,
c. providing at least one aqueous dispersion of tackifier resin,
d. providing at least one plasticizer,
e. providing a first curing agent,
f. providing a second curing agent having a different curing speed than said first curing agent,
g. providing a third curing agent having a different curing speed than said first and second curing agents,
charging said provided materials a–d streamwise in controlled amounts into a mixing vessel and subjecting them to intermixing,
charging controlled amounts of stabilizer, first curing agent, second curing agent, third curing agent and optional additives into said mixing vessel and intermixing them with said previously charged materials,
heating the resulting adhesive mixture to a temperature of about 180° F. for sufficient time to partially cure at least some of said adhesive entity therein, and
discharging the resulting pressure senstive adhesive from said mixing vessel.

4. The process of claim 3 wherein said first adhesive entity is natural rubber latex.

5. The process of claim 4 wherein said one other aqueous dispersion of another adhesive entity is an emulsion of an elastomeric block copolymer.

6. The process of claim 5 wherein said first curing agent is a blend of a hydrobrominated phenol resin and a blocked isocyanate.

7. The process of claim 6 wherein said second curing agent is butyl zimate.

8. The process of claim 6 wherein said second curing agent is zinc resinate.

9. A fluid water base pressure sensitive adhesive with capability of use in production of high temperature quality masking tape comprising pressure sensitive adhesive consisting of the following mixture of components in the percentages by weight as specified based on the total combined weight of said components:

| Component | Percentage |
| --- | --- |
| Adhesive entity | 45 to 65 |
| Tackifier resin | 20 to 40 |
| Plasticizer | 1 to 20 |
| Stabilizer | 0.1 to 10 |
| Curing entity | 1 to 10 |
| Optional additives | 0 to 20 | prepared by the process of claim 3.

10. The pressure sensitive adhesive of claim 1 wherein said said aqueous dispersion is a mixture of components in the percentages by weight as specified based on the total combined weight of said components:

| Component | Percentage |
| --- | --- |
| Adhesive entity | 50 to 60 |
| Tackifier resin | 25 to 35 |
| Plasticizer | 5 to 10 |
| Stabilizer | 1 to 5 |
| Curing entity | 1 to 5 |
| Optional additives | 0 to 10. |

11. The composition of claim 2 wherein said aqueous dispersion comprises at least one fast acting curing agent and at least one slow acting curing agent.

12. High temperature quality pressure sensitive masking tape prepared by the method of claim 2 having a thickness between about 5 to 8 mils, a strength of 15 to 20 lb./inch of width, an elongation of about 5 to 8% and a adhesion value range from 25 to 45 oz/inch.

13. A fluid water base pressure sensitive adhesive prepared by the process of claim 3.

14. A fluid water base pressure sensitive adhesive prepared by the process of claim 3.

15. The fluid water base pressure sensitive adhesive of claim 1 wherein said adhesive entity is selected from the group consisting of natural rubber latex, elastomeric block copolymer latex, polychloroprene latex, and acrylic polymer latex.

* * * * *